United States Patent [19]

Mattos

[11] 4,146,126

[45] Mar. 27, 1979

[54] MODULAR CONVEYOR

[76] Inventor: David W. Mattos, 1501 Stone Creek Dr., San Jose, Calif. 94123

[21] Appl. No.: 752,402

[22] Filed: Dec. 20, 1976

Related U.S. Application Data

[63] Continuation of Ser. No. 580,048, May 22, 1975, Pat. No. 4,007,827.

[51] Int. Cl.² .............................................. B65G 21/14
[52] U.S. Cl. ..................................... 198/862; 198/583
[58] Field of Search ............... 198/860, 861, 862, 863, 198/864, 865, 828, 830, 588, 584, 583, 594, 303, 300; 14/1, 17; 404/1

[56] References Cited

U.S. PATENT DOCUMENTS

| | | | |
|---|---|---|---|
| 2,200,116 | 5/1940 | Maguire et al. | 198/862 |
| 2,837,203 | 6/1958 | Reeser | 198/861 |
| 3,442,370 | 5/1969 | Goodale | 198/860 X |
| 3,474,893 | 10/1969 | Morine | 198/300 |
| 3,596,752 | 8/1971 | Garvey | 198/860 X |
| 3,820,650 | 6/1974 | Garvey | 198/842 |

FOREIGN PATENT DOCUMENTS

| | | | |
|---|---|---|---|
| 2138325 | 2/1972 | Fed. Rep. of Germany | 198/862 |
| 2160539 | 6/1973 | Fed. Rep. of Germany | 198/860 |
| 1157439 | 5/1958 | France | 198/300 |
| 1024007 | 3/1966 | United Kingdom | 404/1 |

Primary Examiner—Robert B. Reeves
Assistant Examiner—Douglas D. Watts
Attorney, Agent, or Firm—Limbach, Limbach & Sutton

[57] ABSTRACT

A modular conveyor particularly adapted for food processing installations including a plurality of pedestals arranged along a single line and removably connected to a plurality of aligned beams and laterally-spaced side rails to support a plurality of belt-supporting rollers. The conveyor can be adjusted to a cleaning position where the conveyor belt is opened for interior cleaning while still permitting the belt to be driven by its usual driving mechanism.

4 Claims, 6 Drawing Figures

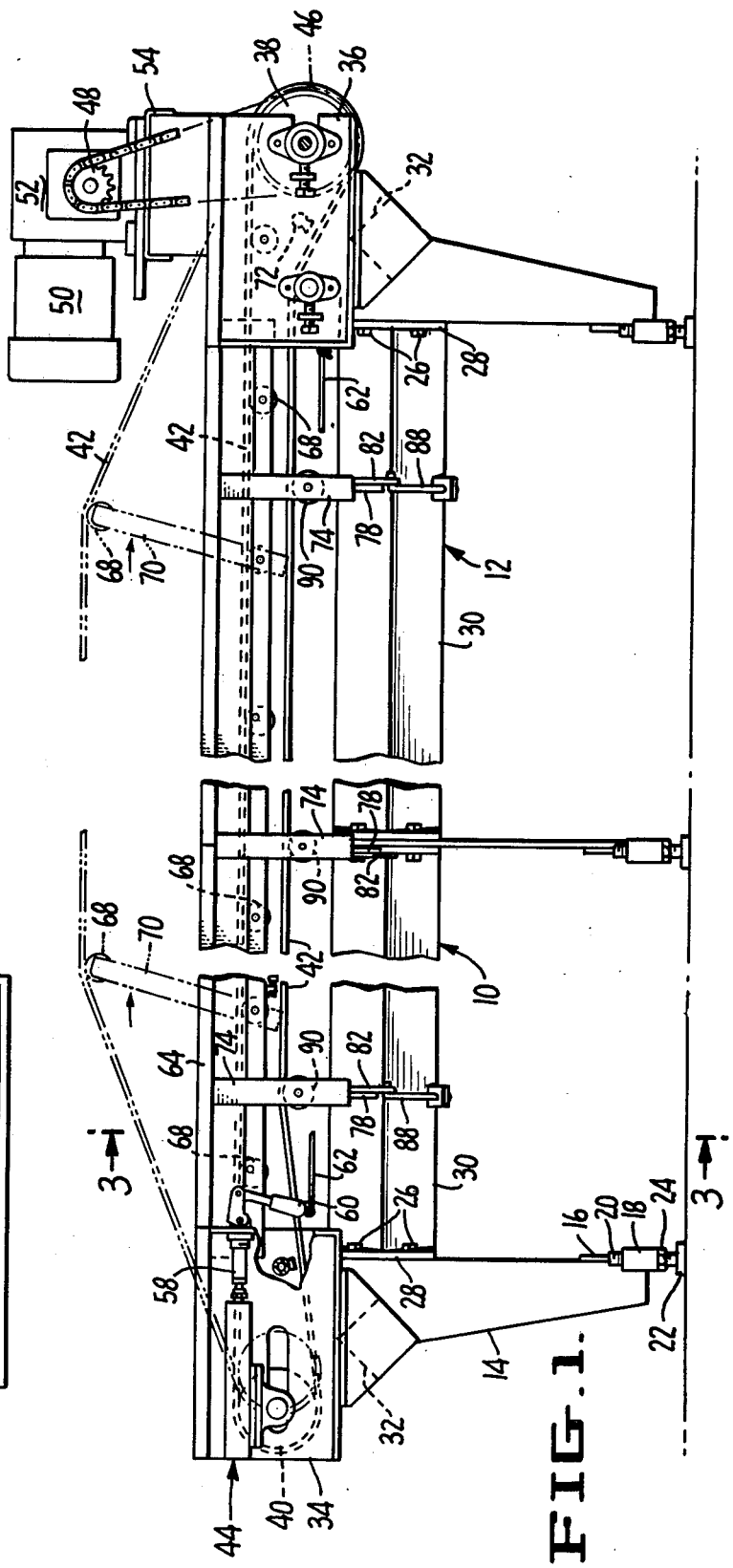
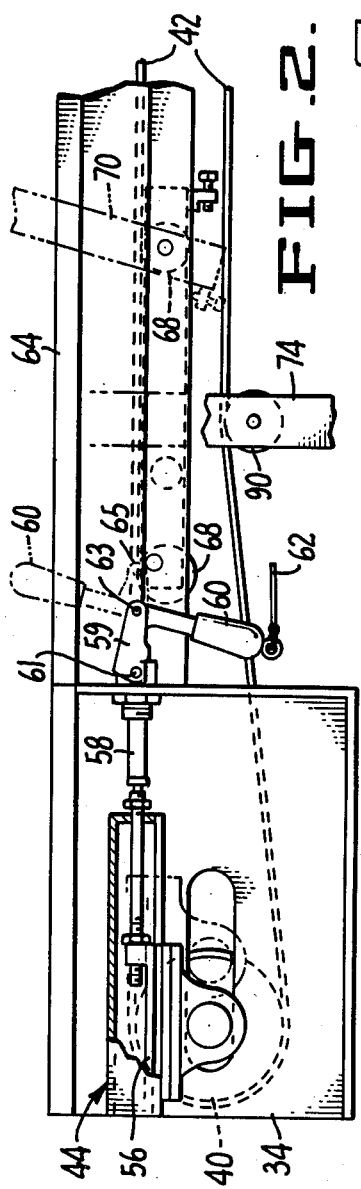

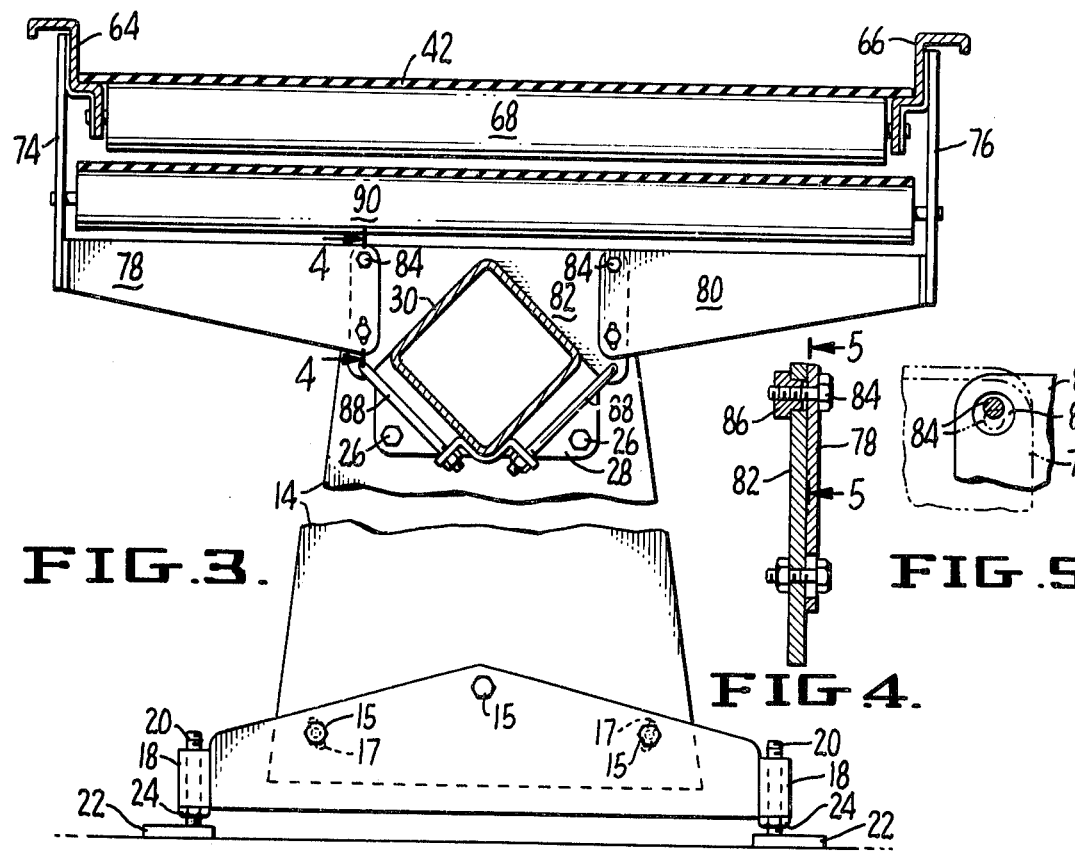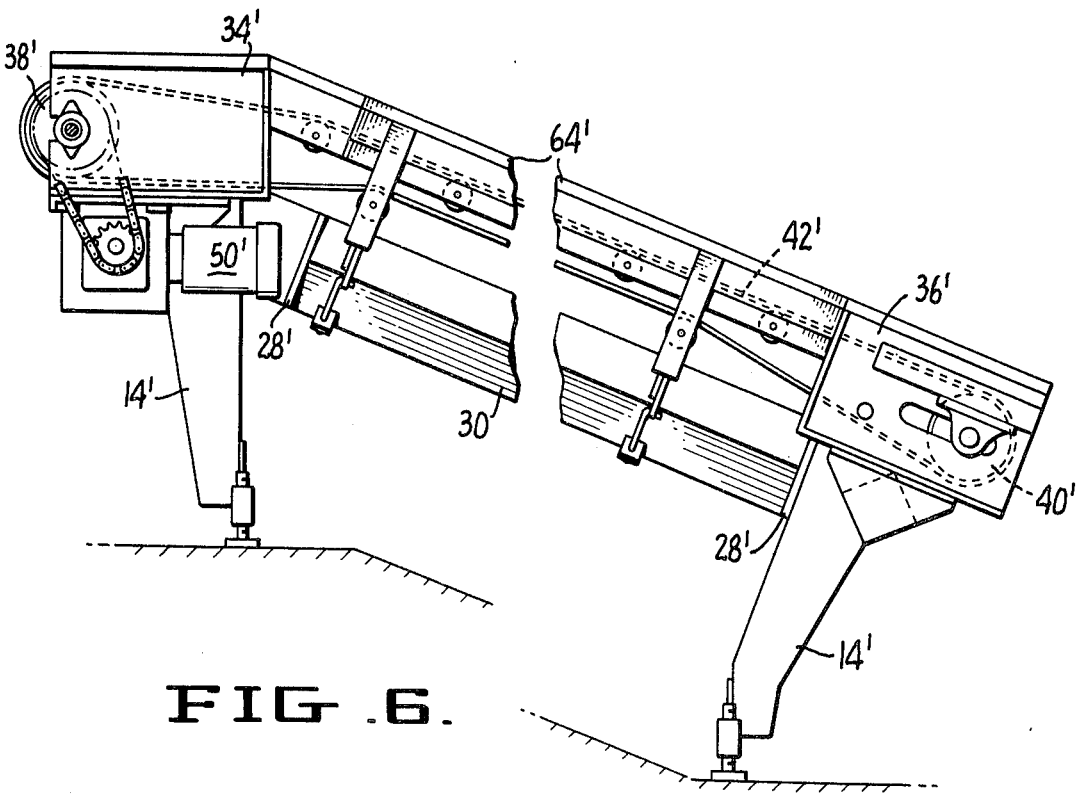

MODULAR CONVEYOR

This is a continuation of application Ser. No. 580,048, filed 22 May 1975, now U.S. Pat. No. 4,007,827.

FIELD OF THE INVENTION

The present invention relates generally to conveyors and more particularly, to a modular conveyor composed of a plurality of sections or modules.

BACKGROUND OF THE INVENTION

Conveyors, of course, are generally used for the transport of many articles and, in particular, are utilized to a large extent to carry fruits and vegetables and other food products between various processing stations.

Generally, in the past, each food processing plant is laid out in a particular manner and the requisite conveyors represent custom installations to meet the particular layout requirements and if any change in the plant layout or disposition of the processing stations is required, the old conveyors usually must be discarded and a new custom set of conveyors must be installed at a substantially exorbitant cost.

Furthermore, in the case of food processing, sanitation is a prime and essential consideration, and most of the custom installed conveyors have provided ledges, pockets, and various horizontal surfaces which accumulate debris from the food being processed so that cleaning becomes a serious and difficult problem necessitating considerable down-time of the equipment to meet basic sanitation standards, particularly since portions of the conveyors are substantially inaccessible.

SUMMARY OF THE PRESENT INVENTION

Accordingly, the general objective of the present invention is to provide a modular conveyor including a plurality of sections or modules including components which are removably connected and interchangeable, thus to enable ready assembly to meet substantially all installation requirements, and furthermore provide a sanitary and readily cleansed assembly.

Briefly, such objective is achieved by providing a plurality of single upright pedestals that can be supported on the floor or supporting surface at various selected spaced intervals to rise therefrom and support therebetween adjacent their upper extremities a plurality of single central supporting beams. The pedestals and beams are interconnected by bolts or other removable interconnections so that they can be quickly disconnected and alternate pedestals and or beams can be substituted to meet the particular installation requirements. In turn, each pedestal supports laterally-extending members of selected lengths that are also bolted thereto and support, again, by suitable bolted connection at opposite sides of the central beam, a pair of side rails which in turn are formed with suitable openings for the reception of drive or idler rollers for endless conveyor belts. Like the pedestals and beams, the side rails can have different lengths, each particular side rail being arranged generally to be longitudinally co-extensive with the central supporting beam so that adjustment for various plant layout requirements can readily be achieved and in turn, can accommodate rollers of various lengths which in turn, are adapted to support the desired conveyor belt in whatever form it may take. The lateral members are also arranged to support at their extremities suitable supporting plates for takeup bearings, drive sprockets, and the like to provide powered connection to the conveyor belt.

In addition to the various dimensions of the modules, longitudinally or laterally, the pedestals, beams, side rails, and other components are all designed to present minimal pockets or ledges, thus to avoid accumulation of the products being transported by the conveyor thereon, and all components are arranged to provide ease of cleansing.

It is very important to permit a food processing conveyor to be cleaned, and my modular conveyor is specifically designed for cleaning. Thus I provide a pair of movable support rollers under the top run of the conveyor which may be moved up to the cleaning position exposing the inner parts of the conveyor. Additionally, I provide an incremental adjustment for the idler roller at one end of the conveyor to shorten the conveyor belt path by a distance equal to the distance by which the belt path is increased with the rollers which are raised. In this way the conveyor can be operated by its normal power supply in the cleaning position.

BRIEF DESCRIPTION OF THE DRAWINGS

The stated objective of the invention and the manner in which it is achieved, as summarized hereinabove, will be more readily understood by reference to the following detailed description of the exemplary embodiments of the invention shown in the accompanying drawings wherein:

FIG. 1 is a side elevational view of a modular conveyor embodying the present invention, FIG. 2 is an enlarged fragmentary side elevational view of a belt release arrangement in the FIG. 1 unit, FIG. 3 is an enlarged transverse cross section taken along line 3—3 of FIG. 1, FIG. 4 is a fragementary cross-sectional view taken along line 4—3 of FIG. 3, FIG. 5 is a fragmentary cross-sectional view taken along line 5—5 of FIG. 4, and FIG. 6 is a side elevational view, similar to FIG. 1, of a slightly modified arrangement wherein the conveyor essentially is arranged to provide a gradual upwardly angular conveyance of the products.

DETAILED DESCRIPTION OF THE EXEMPLARY EMBODIMENT OF THE INVENTION

With initial reference to FIG. 1, the modular conveyor embodying the present invention, is shown in two conjoined modules or sections 10, 12 although it will be apparent from the following description that any number of modules or sections of various lateral or longitudinal dimensions can be conjoined readily by interconnection of the appropriate number and character of modular components. Each module can readily be constructed up to an overall length of 20 feet.

More particularly, the modular conveyor includes longitudinally-spaced generally upright central pedestals 14. Each pedestal 14 is preferably formed from a single sheet of steel bent at its lateral edges to form flanges in a generally rectangular transverse configuration. Thus, the pedestals 14 present only substantially vertical surfaces so no product can accumulate thereon and washing is rendered extremely simple. At their lower ends, each of the individual pedestals 14 is bolted by three bolts 15 to a lateral flange 16. The outer openings in the flange 16 that receive the bolts 15 take the form of arcuate slots 17 enabling the entire flange to be adjustably tilted to accommodate any unevenness of the supporting surface. The flange 16 carries at its outer and opposite extremities a pair of tubular sockets 18 in substantially upright dispositions that loosely receive therein threaded studs 20 mounting floor-engaging feet 22 at their lower extremities and adjustably secured in the sockets by suitable nuts 24, thus allowing the raising or lowering of the pedestals as required.

Adjacent its upper extremity each of the pedestals 14 is provided with suitable holes enabling interconnection by removable bolts 26 to flanges 28 formed at the end of a tubular longitudinal beam 30 which can be of any desired length enabling the ready accommodation of the entire unit to various dimensional requirements of a particular plant layout. As best shown in FIG. 3, each tubular beam 30 has a generally rectangular cross-section with one apex of the beam at the uppermost position thus exposing only downwardly-sloping surfaces to any product falling thereon wherefor accumulation of the product thereon is effectively and automatically avoided.

At the opposite extremitites of the two module units 10, 12 shown in FIG. 1, cross-members 32 also of rectangular tubular configuration and disposed with the upper apex of the tube in an uppermost position extend laterally from the end pedestals and are flanged at their outward extremities to support bearing plates 34, 36 for drive and idler rollers 38, 40 at the opposite extremities of the unit in engagement with an endless conveyor belt 42. More particularly as shown in FIG. 1, the bearing plates at one end are slotted to provide a takeup support 44 for the idler roller 40 and in turn, the bearing plates 36 at the right end of the unit are arranged for the adjustable support of a drive sprocket 46 connected to the end of the drive roller 38 on its supporting shaft so as to enable drive connection through a suitable sprocket 48 with a motor 50 and reducing gear 52 mounted thereabove on a transverse support plate 54.

As best shown in FIG. 2, the takeup support 44 includes a carrier 56 for the bearing for the idler roller 40 that is engaged at one extremity of an actuating rod 58 whose opposite extremity is connected to a toggle linkage having a pivoted handle 60 which when moved from the lower full line disposition in a counterclockwise direction to the upper dotted line disposition allows the idler roller 40 to move to the right releasing the tension on the supported conveyor belt 42. The toggle linkage may be a conventional linkage such as a linkage sold under the tradename DESTACO where a central toggle arm 59 is pivotally connected by pin 61 to a bolt on frame 34. The handle 60 is pivotally connected to link 59 by pin 63, and the handle 60 has a dogleg connected to the rod 58 by the pivot pin shown in phantom at 65. A taut line 62 is preferably connected between the end of the handle 60 and the opposite bearing plate 36 enabling an operator to grasp the line and release each handle 60 so that tension and roller driving connection to the belt 42 is instantly released, thus providing a convenient safety feature.

The bearing plates 34, 36 are flanged at their upper extremities to also support by suitable bolted connections side rails 64, 66, each of which, as best shown in FIG. 3, includes a top horizontal flanged portion which is integrally connected with a vertical downwardly-extending portion, an intermediate horizontal portion and a final downwardly projecting portion which is provided with openings at spaced intervals along each of the side rails for the rotary support of a plurality of idler rollers 68, the typical spacing between such idler rollers being in the neighborhood of twelve inches thus to enable the substantially level support of the upper flight of the endless conveyor belt 42 that can be formed of any suitable material and of the required dimensions depending upon the requirements of the particular installation. Preferably the side rails 64, 66 are modular with lengths equal to the length of the beam 30 ending in planes perpendicular to the ends of the beam. More particularly, the idler roller dimensions are such that the laterally projecting portions of the belt 42 engage the intermediate horizontal portion of the side rails 64, 66 so that a substantially level disposition of the belt on the idler rollers is maintained and the product is precluded from the accidental dislodgement off the sides of the belt by the vertical portions of the side rails.

Preferably, as shown in FIG. 1, two idler rollers 68 near opposite ends of the unit are carried by a subframe 70 pivoted between side rails 64 and 66 enabling it to be raised from the full-line level operative disposition to the dotted line raised disposition when the previously described takeup support 56 has been released so that the conveyor belt 42 has considerable slack. The subframes 70 should all rotate in the same direction slightly more that 90 degrees from the lowered to the raised position so that the subframes are generally parallel in the raised position slanted in the direction of movement of the top course of the belt as illustrated by the subframe 70 at the left of FIG. 1, and in this elevated position, the subframes are supported by adjustment stop screws. Such raising of the belt 42 facilitates interior cleaning and preferably small spray tubes 72 are mounted adjacent the end idler and drive rollers 38, 40 and can be connected to a suitable source of water when cleaning is required.

The distance which the belt path is shortened by swinging handle 60 is approximately equal to the distance that the belt path is lengthened by swinging subframes 70 to the upper dotted position. For this reason the belt can be driven during cleaning in the open position shown in FIG. 1.

At intermediate positions along the length of the longitudinal beam or beams 30, the side rails 64, 66 can be provided with additional vertical support rods 74, 76 carried at the outer ends of laterally-extending flanges 78, 80 as best shown in FIG. 3, that can be bolted at their inner ends to a simple plate 82.

With additional reference to FIGS. 4 and 5, the inner end of each flange 78, 80 is provided with an upper round opening and a lower slot. An upper connecting bolt 84 mounts an eccentric nut 86 which can be turned to raise or lower the flange position, the lower slot being sufficiently long to accommodate the adjustment. The lower plate 82 is adjustably clamped by rods 88 to the beam 30 at any desired longitudinal position, the described clamping mechanism being adapted to be secured to the tubular beam at any and all positions depending upon the particular requirements. Suitable idler rollers 90 for the return flight of the endless belt 42 can be secured in the support rods 74, 76.

From what has been described hereinabove, it is apparent that the length of the beams 30, the side rails 64, 66, the transverse members, and the associated conveyor belt 42 can be varied to meet the requirements of both length and width. Furthermore, as can be seen by reference to FIG. 6, the same beam 30 and side rails 64, 66 can be utilized in connection with pedestals 14' having mounting flanges 28' at its opposite extremities to provide a basically angular conveyor structure. Accordingly, no repetition of the details of the structure shown in FIG. 6 will be made but corresponding parts will be indicated by an added prime notation.

Yet other modifications in this structure as described can obviously be envisioned within the scope of the spirit of the invention and accordingly the foregoing description of but two embodiments is to be considered as purely exemplary and not in a limiting sense and the actual scope of the invention is to be indicated only by reference to the appended claims. The pedestals 14 may for instance be connected to the beam 30 intermediate the ends of the beam by connections like the connections for plates 82 in FIG. 3.

What is claimed is:

1. A modular conveyor comprising:
   (a) at least a pair of support members, and
   (b) at least one, hollow, central supporting beam, the central supporting beam having a square cross-section, flanges on each end of the supporting beam, the flanges being selectively and removably attachable to the support members such that the supporting beam when mounted at its opposite ends by the flanges to the support members is positioned such that the diagonal between one pair of opposed apexes of the cross-section of the beam is oriented vertically,
   (c) at least a pair of side rails equal in length to the length of the beam, means for mounting the side rails parallel to each other and parallel to the length of the supporting beam with the side rails being equally spaced from each other and equally spaced from the beam, and
   (d) a plurality of rollers mounted between the side rails, and further including end, hollow cross members, the end cross members having a rectangular cross-sectional configuration, and being mounted on the support members, the diagonal between an opposing pair of apexes of the cross-section of the cross members being oriented vertically, flanges at the opposite ends of the cross members, bearing plates supported on the flanges of the cross members, a drive roller for entraining a belt, the drive roller being supported between the bearing plates, and means for driving at least one of the rollers.

2. A modular conveyor as recited in claim 1 wherein the central supporting beam is comprised of a plurality of sections of uniform length, each section terminating at each end in a flange which is bolted to a corresponding flange on the next succeeding section, each section of the supporting beam having a predetermined length.

3. A modular conveyor comprising
   (a) at least a pair of support members,
   (b) a singular, hollow, central supporting beam, the central supporting beam having a square cross-section, flanges on each end of the supporting beam which are selectively and removably attachable to the support members such that the supporting beam when mounted at its opposite ends by the flanges to the support members is positioned such that the diagonal between one pair of opposed apexes of the cross-section of the beam is oriented vertically,
   (c) a plurality of belt supports, and
   (d) means adjustably mounted on the central supporting beam for attaching the belt supports to the central supporting beam at spaced apart locations along its length and wherein the belt supports are rollers and the means for attaching them to the central supporting beam comprise flanges and clamps for clamping the flanges onto the central supporting beam and perpendicular to it whereby access to the central supporting beam from its side is unimpeded between the flanges and the spacing between the flanges is adjustable.

4. A modular conveyor as recited in claim 3 wherein the flanges are mounted on the clamps in pairs and the flanges of each pair extend outwardly with respect to the central supporting beam on opposite sides of it, and further including means for adjustably mounting the flanges to the clamps so that the vertical position of the flanges with respect to the clamps can be adjusted.

* * * * *